United States Patent [19]
Hamanaka et al.

[11] Patent Number: 5,298,211
[45] Date of Patent: Mar. 29, 1994

[54] METHOD FOR PRODUCING THERMOPLASTIC ELASTOMER COMPOSITION

[75] Inventors: Tatsuo Hamanaka; Noboru Komine; Tadashi Hikasa; Yuji Gotoh; Keitaro Kojima, all of Chiba, Japan

[73] Assignee: Sumitomo Chemical Company, Limited

[21] Appl. No.: 985,269

[22] Filed: Dec. 3, 1992

[30] Foreign Application Priority Data

Dec. 19, 1991 [JP] Japan .................. 3-355273

[51] Int. Cl.$^5$ ............................................. B29C 35/04
[52] U.S. Cl. ........................ 264/211.240; 264/331.13; 264/349
[58] Field of Search .................. 264/211.24, 331.13, 264/349, 140-142

[56] References Cited

U.S. PATENT DOCUMENTS

| | | | |
|---|---|---|---|
| 4,081,502 | 3/1978 | Blumel et al. | 264/140 |
| 4,197,381 | 4/1980 | Alia | 264/349 |
| 4,594,390 | 6/1986 | Abou-Sabet . | |
| 4,663,103 | 5/1987 | McCullough et al. | 264/349 |
| 4,897,236 | 1/1990 | Rabiger et al. | 264/349 |

FOREIGN PATENT DOCUMENTS

| | | | |
|---|---|---|---|
| 56-86919 | 7/1981 | Japan | 264/349 |
| 1-295818 | 11/1989 | Japan | 264/211.24 |
| 67-03181 | 9/1967 | Netherlands | 264/349 |

OTHER PUBLICATIONS

Masanori Miyazawa, "Biaxial Screw Extruders: Functions and Applications of PCM", Plastics, vol. 41, No. 7, Jul. 1, 1990, (certified translation attached).

Primary Examiner—Jeffery Thurlow
Attorney, Agent, or Firm—Cushman, Darby & Cushman

[57] ABSTRACT

Provided is a method for producing a thermoplastic elastomer composition excellent in flexibility, mechanical properties and extrusion moldability which comprises directly feeding a particulate olefinic copolymer rubber (A) having a particle shape index $\alpha$ defined below of 0.1–0.9 and an olefinic plastic (B) to a continuous kneading extruder to carry out melt kneading and then, feeding an organic peroxide to downstream side of said extruder to carry out dynamic crosslinking:

$$\alpha = D_A/D_B$$

wherein $D_A$ denotes bulk density of the particulate olefinic copolymer rubber (A) and $D_B$ denotes bulk density of the olefinic plastic (B).

6 Claims, 1 Drawing Sheet

METHOD FOR PRODUCING THERMOPLASTIC ELASTOMER COMPOSITION

The present invention relates to a method for producing thermoplastic elastomer compositions. More particularly, it relates to a method for producing olefinic thermoplastic elastomer compositions excellent in mechanical properties and substitutable for vulcanized rubbers.

Various uses of thermoplastic elastomers (hereinafter referred to as "TPE") have been developed in the fields of automobile parts, appliance parts and haberdasheries utilizing their features that vulcanizing step is not required and they can be processed by molding machines for ordinary thermoplastic resins. Among them, olefinic TPE compositions are known, for example, in Japanese Patent Kokai No. 58-26838. However, these compositions have limit in their use in the field of substitutes for vulcanized rubbers because they are inferior to vulcanized rubbers in flexibility, tensile strength at break, elongation at break and compression set.

Various attempts have been made for improving these properties, for example, impartation of flexibility by adding mineral oil type softeners or peroxide-uncrosslinking type hydrocarbon rubbery materials or improvement of compression set by increasing crosslinking degree using crosslinking aids, as reported in Japanese Patent Kokoku No. 56-15740 and Japanese Patent Kokai Nos. 58-25340, 58-152023 and 59-58043.

However, even if compression set of these compositions is improved by increasing crosslinking degree, there occurs reduction in flexibility, decrease in breaking strength and breaking extension in tensile strength tests or bleeding of the softener to the surface of the compositions and thus, it is difficult to obtain olefinic TPE compositions well balanced in properties.

Accordingly, the object of the present invention is to provide a method for producing olefinic TPE compositions which are substitutable for vulcanized rubbers in respect of flexibility and mechanical properties, especially, tensile strength at break, elongation at break and compression set and are excellent in blow moldability, extrusion moldability and injection moldability.

As a result of intensive research conducted by the inventors, it has been found that compositions prepared by dynamic crosslinking of particulate olefinic copolymer rubbers having a specific particle shape index and olefinic plastics by a specific method are excellent in flexibility and mechanical properties. Thus, the present invention has been accomplished.

That is, the present invention relates to a method for producing a thermoplastic elastomer composition, characterized by directly feeding (A) a particulate olefinic copolymer rubber having a particle shape index $\alpha$ shown by the following formula of 0.1-0.9 and (B) an olefinic plastic to a continuous kneading extruder to carry out melt kneading and then, feeding an organic peroxide at downstream side of the extruder to carry out dynamic crosslinking.

$$\alpha = D_A/D_B$$

$D_A$: Bulk density of particulate olefinic copolymer rubber (A)

$D_B$: Bulk density of olefinic plastic (B)

Figure 1:
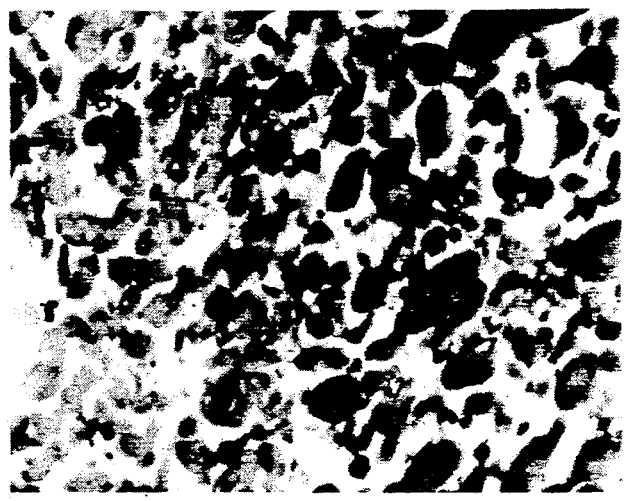
FIG. 1 is an electron microscope which shows particle structure of the composition obtained in Example.

The particulate olefinic copolymer rubber (A) is preferably a particulate oil extended olefinic copolymer rubber containing 20-150 parts by weight of a mineral oil softener per 100 parts by weight of the olefinic copolymer rubber.

Furthermore, the dynamic crosslinking is preferably carried out at a maximum shear rate of 500/sec or higher.

The olefinic copolymer rubbers which constitute the particulate olefinic copolymer rubbers (A) used in the present invention are amorphous and random elastomeric copolymers mainly composed of olefins such as ethylene-propylene copolymer rubber, ethylene-propylene-non-conjugated diene rubber, ethylene-butene-1-non-conjugated diene rubber and propylene-butene-1 copolymer rubber. Among them, ethylene-propylene-non-conjugated diene rubber (hereinafter referred to as "EPDM") is especially preferred. The non-conjugated dienes include, for example, dicyclopentadiene, 1,4-hexadiene, cyclooctadiene, methylenenorbornene and ethylidenenorbornene. Ethylidenenorbornene is especially preferred.

More specific preferable examples are ethylenepropylene-ethylidenenorbornene copolymer rubbers containing 10-55% by weight, preferably 20-40% by weight of propylene and 1-30% by weight, preferably 3-20% by weight of ethylidenenorbornene.

If propylene content is less than 10% by weight, flexibility is lost and if it is more than 55% by weight, mechanical properties deteriorate. If ethylidenenorbornene content is less than 1% by weight, mechanical properties deteriorate and if it is more than 30% by weight, injection moldability is inferior.

Mooney viscosity $ML_{1+4}$ 100° C. of the olefinic copolymer rubbers is preferably 30-350. If it is lower than 30, mechanical properties are lost and if it is higher than 350, appearance of molded products is damaged.

If necessary, mineral oil softeners can be used in the present invention. They can be fed from optional portions of the extruder or can be used as oil extended olefinic copolymer rubbers by previously incorporating into the olefinic copolymer rubbers.

When $ML_{1+4}$ 100° C. is 30-150, preferably the former method is employed and when it is 80-350, preferably the latter method is employed.

From the point of properties of olefinic TPE compositions obtained by the present invention, olefinic copolymer rubbers having an $ML_{1+4}$ 100° C. of 80-350 are preferred. Mechanical properties such as tensile strength at break and elongation at break are markedly improved and compression set is also improved due to increase of cross-linking degree by using the olefinic copolymer rubbers having an $ML_{1+4}$ 100° C. of 80-350. From the point of properties, $ML_{1+4}$ 100° C. is more preferably 120-350, especially preferably 140-300.

When oil extended olefinic copolymer rubbers are used, they contain mineral oil softeners in an amount of 20-150 parts by weight, preferably 30-120 parts by weight per 100 parts by weight of the olefinic copolymer rubbers. If the content is less than 20 parts by weight, flowability of olefinic TPE compositions decreases and especially extrusion processability and injection moldability are damaged. If it is more than 150 parts by weight, plasticity much increases and processability deteriorates and besides, performances of the products deteriorate.

Mooney viscosity $ML_{1+4}$ 100° C. of the oil extended olefinic copolymer rubbers is preferably 30-150, more preferably 40-100. If it is lower than 30, mechanical properties are lost and if it is higher than 150, processability is inferior.

The mineral oil softeners used in the oil extended olefinic copolymer rubbers are petroleum fractions of high boiling point added for improvement of processability and mechanical properties and include, for example, paraffinic, naphthenic and aromatic oils and paraffinic oils are preferred. When aromatic components increase, contamination increases and there are limits in use for making transparent products or light color products.

Next, properties and production of oil extended olefinic copolymer rubbers (oil extended EPDM) will be explained taking the case of EPDM.

When the mineral oil softeners are added in a large amount to EPDM an $ML_{1+4}$ 100° C. of 80-350, olefinic TPE compositions capable of simultaneously attaining the improvement of processability resulting from ensuring of flexibility and increase of flowability and the improvement of mechanical properties can be obtained.

Mineral oil softeners are generally used as flowability improvers in olefinic TPE compositions, but according to the research conducted by the inventors, when oil extended EPDM is not used, addition of more than 40 parts by weight of mineral oil softeners to 100 parts by weight of EPDM causes bleeding of the softeners to the surface of TPE compositions to bring about staining and tackiness of products.

However, when oil extended EPDM previously containing 20-150 parts by weight of mineral oil softeners per 100 parts by weight of EPDM having an $ML_{1+4}$ 100° C. of 80-350 is used, TPE compositions can be obtained which show little bleeding of softener, have no stain and tackiness and are excellent in properties such as tensile strength at break, elongation at break and compression set. Bleeding of softener is not seen in spite of the high content of the softener. It is considered that this is because upper limit of oil extension amount of the mineral oil softener increases when EPDM of relatively high Mooney viscosity is used and previously properly added softener is uniformly dispersed in EPDM.

Oil extension of EPDM is carried out by known methods. For example, oil extension can be performed by mechanical kneading of EPDM and mineral oil softener using apparatuses such as roll and Banbury mixer. Alternatively, a given amount of mineral oil softener is added to EPDM solution and then the solvent is removed by steam stripping or the like. Preferred is to use the EPDM solution and use of EPDM solution obtained by polymerization is preferable for easy operation.

Particulate olefinic copolymer rubbers (A) can be obtained from (oil extended) olefinic copolymer rubbers by the following methods.
1. Grinding of bale form rubbers.
   (1) Grinding by grinders generally used for rubbers.
   (2) Grinding by high-speed mills or jet grinders at low temperatures.
2. Granulation by extruders and the like.
3. Sheeting by roll and the like and granulating the sheet by pelletizer.
4. Using crumby polymer per se obtained by removal of solvent after polymerization.

The methods 1 and 4 are preferred.

Particles of the particulate rubbers mean amorphous particles and include not only spherical or columnar particles, but also rectangular, flaky, crumby and linty particles and further include those which contain voids such as foamed particles. That is, there are no limitations in their form as far as they can be recognized as individual particles.

Moreover, a small amount of powders such as inorganic fillers, olefinic plastics, organic lubricants and inorganic lubricants and liquid materials such as silicone oil can be deposited on the surface of the particulate rubbers or incorporated into the particulate rubbers for inhibition of sticking of the particles to each other.

The olefinic plastics (B) used in the present invention are polypropylene or copolymers of propylene with α-olefins of two or more carbon atoms. Examples of the α-olefins of two or more carbon atoms are ethylene, 1-butene, 1-pentene, 3-methyl-1-butene, 1-hexene, 1-decene, 3-methyl-1-pentene, 4-methyl-1-pentene and 1-octene.

Melt flow rate of the polymers is preferably 0.1-100 g/10 min, more preferably 0.5-50 g/10 min. If the melt flow rate is less than 0.1 g/10 min or more than 100 g/10 min, there may occur problems in processability.

Weight ratio of the particulate olefinic copolymer rubbers (A) and the olefinic plastics (B) is preferably (A)/(B)=20-95/80-5, more preferably 35-90/65-15, especially preferably 35-85/65-15.

The particle shape index α in the present invention is a ratio of bulk density $D_A$ of the particulate olefinic copolymer rubber (A) and bulk density $D_B$ of the olefinic plastic (B) which is represented by the following formula.

$$\alpha = D_A/D_B$$

The α is an index which greatly influences the step of carrying out melt kneading of the components (A) and (B) by directly feeding them to an extruder.

Especially, in the case of using an olefinic copolymer rubber having a high $ML_{1+4}$ 100° C., the α has a great influence on morphology of the composition of said copolymerrubber and olefinic plastic.

The dispersibility of the resulting composition exerts a great influence on properties and processability of the TPE composition obtained through the subsequent dynamic crosslinking step.

The particle shape index α in the present invention is in the range of 0.1-0.9. If it is less than 0.1, transporting efficiency is inferior in solid transporting part of the continuous kneading extruder and sometimes blockage occurs. Further, mixability and kneadability in kneading part of kneader also reduce and besides, it is dificult to form satisfactory morphology in the resulting TPE composition.

The α is preferably in the range of 0.3-0.8.

Organic peroxides used for dynamic crosslinking of a mixture comprising particulate olefinic copolymer rubber (A) and olefinic plastic (B) include 2,5-dimethyl-2,5-di-(t-butylperoxy)hexane, 2,5-dimethyl-2,5-di(t-butylperoxy)hexyne-3, 1,3-bis(t-butylperoxyisopropyl)benzene, 1,1-di-(t-butylperoxy)-3,5,5-trimethylcyclohexane, 2,5-dimethyl-2,5-di(peroxybenzoyl)hexyne-3 and dicumyl peroxide. Among them, especially preferred is 2,5-dimethyl-2,5-di(t-butylperoxy)hexane from the points of smell and scorch.

Amount of the organic peroxide can be selected from the range of 0.005-2.0 parts by weight, preferably 0.01-0.6 part by weight for totally 100 parts by weight of the olefinic copolymer rubber and the olefinic plastic. If it is less than 0.005 part by weight, the effect of crosslinking reaction is low and if it is more than 2.0 parts by weight, the reaction can be controlled with difficulty and besides, this is economically not advantageous.

As crosslinking aids in dynamic crosslinking with organic peroxides in production of the composition of the present invention, there may be used peroxide crosslinking aids such as N,N'-m-phenylenebismaleimide, toluylenebismaleimide, p-quinone dioxime, nitrobenzene, diphenylguanidine and trimethylolpropane and polyfunctional vinyl monomers such as divinylbenzene, ethylene glycol dimethacrylate, polyethylene glycol dimethacrylate, trimethylolpropane trimethacrylate and allyl methacrylate. Addition of these compounds results in occurrence of uniform and gentle crosslinking reaction and a reaction between the olefinic copolymer rubber and the olefinic plastic, whereby mechanical properties can be improved.

Amount of the crosslinking aid can be selected from the range of 0.01-4.0 parts by weight, preferably 0.05-2.0 parts by weight for totally 100 parts by weight of the olefinic copolymer rubber and the olefinic plastic. If the amount is less than 0.01 part by weight, the effect of addition hardly appears and if it is more than 4 parts by weight, this is economically no advantageous.

Specific process for production of the TPE composition by dynamically crosslinking a mixture comprising olefinic copolymer rubber and olefinic plastic will be explained below.

First, particulate olefinic copolymer rubber (A) and olefinic plastic (B) at a specific ratio are directly fed to a continuous kneading extruder and melt kneaded therein.

Then, organic peroxide is fed from a feed opening provided at downstream side of the extruder and dynamic crosslinking is carried out to obtain the desired TPE composition.

As the continuous kneading extruder, there may be used single screw continuous kneading extruders, twin screw continuous kneading extruders and three screw or more multiple screw continuous kneading extruders fitted with screws or rotors designed to have kneadability improving functions and combination of these extruders connected so that materials in the extruders can be moved in molten state.

Screws and rotors designed to have kneadability improving functions include Dulmage, pin and multiple flight screws for single screw type and kneading disk and rotor for twin screw type.

In the present invention, twin screw continuous kneading extruders. Rotating can be either different direction type or same direction type.

As these continuous kneading extruders, the following types can be exemplified among those which are commercially available. Buss Ko-kneader (manufactured by Buss AG.) and Model HM (manufactured by Mitsubishi Heavy Industries, Ltd.) as single screw continuous kneading extruders and Model ZSK (manufactured by Werner & Pfleiderer GmbH), Model TEX (manufactured by the Japan Steel Works, Ltd.), Model TEM (manufactured by Toshiba Machine Co., Ltd.), Model KTX (manufactured by Kobe Steel, Ltd.) and Mixtron LCM (manufactured by Kobe Steel, Ltd.) as twin screw continuous kneading extruders.

In the present invention, maximum shear rate at dynamic crosslinking is preferably 500/sec or higher and this can be attained only by using the above continuous kneading extruders and cannot be obtained by the conventional batch type mixers such as Banbury mixer and roll.

If the shear rate is less than 500/sec, production efficiency is low and TPE compositions excellent in appearance and properties can hardly be obtained.

Specific steps in the production method will be explained below.

In the step for melt kneading of particulate olefinic copolymer rubber (A) and olefinic plastic (B), first, belt type and screw type feeders can be used for feeding of components (A) and (B) to extruders and screw type forcing apparatuses can also be used.

Weight ratio of components (A)/(B) is preferably 20-95/80-5 and if (B) is less than this range, properties are apt to deteriorate at the time of dynamic crosslinking and much heat tends to generate by shearing.

Preset temperature of continuous kneading extruder varies depending on melting point and flowability of the materials, especially olefinic plastics, but is preferably in the range of 100°-250° C.

In order to form good morphology of compositions comprising components (A) and (B), the kneading part preferably has screws or rotors designed to have a function to improve kneadability.

In the subsequent step of dynamic crosslinking, the organic peroxide can be used after diluted with liquid or powdery materials.

Feeding of the peroxide from the feed opening provided halfway the extruder is carried out by dropping it to the feed opening or injecting it into cylinder by a metering pump in the case of liquid and by feeding it to the feed opening by a weighing feeder in the case of powder.

As the diluents, there may be used oils, organic solvents and inorganic fillers such as silca and talc.

Preset temperature of dynamic crosslinking part of the extruder is preferably 150° C. or higher though it depends on decomposition temperature of the organic peroxide used. It is preferably 150°-300° C. since it is important that the organic peroxide has been nearly completely consumed at the outlet of the extruder.

It is preferred that the dynamic crosslinking part has devices having the function to improve kneadability, such as rotors and kneading discs in the case of twin screw kneaders.

Maximum shear rate of the dynamic crosslinking part is preferably 500/sec or higher. However, if it is too high, decomposition, deterioration and coloration are apt to be brought about due to heat generation.

In the present invention, additional olefinic plastic may be introduced at any positions of upstream-downstream of the extruder. It may be introduced after the dynamic crosslinking step.

When crosslinking aid is used in the present invention, it is preferred to feed it before or simultaneously with feeding of the organic peroxide.

Furthermore, if necessary, inorganic fillers, antioxidants, weathering agents, antistatic agents, lubricants and coloring pigments may also be used. These may be introduced at any portions of the extruder.

Further, the mineral oil softener may be fed at any portions of the extruder. However, when it is used in a large amount, it is preferably fed in portions from many feed openings. When the mineral oil softener is needed, it is further preferred to use it as particulate oil extended olefinic copolymer rubbers.

Uses of the olefinic TPE compositions of the present invention as substitutes for vulcanized rubbers include automobile parts such as weatherstrips, ceiling materials, interior sheets, bumper molding, side molding, air spoiler, air duct hoses and various backings, civil engineering materials and construction materials such as waterstops, joint fillers and window frames for buildings, sporting goods such as golf clubs and grips of tennis rackets, industrial parts such as hose tubes and gaskets, and appliances parts such as hoses and backings.

The present invention will be illustrated by the following examples.

Methods for measurement of properties in the examples and comparative examples are as follows.

(1) Mooney viscosity ($ML_{1+4}$ 100° C.) (hereinafter referred to as "viscosity"): This was measured in accordance with ASTM D-927-57T.

Viscosity ($ML_1$) of EPDM was calculated by the following formula.

$$\log (ML_1/ML_2) = 0.0066(\Delta PHR)$$

$ML_1$: Viscosity of EPDM
$ML_2$: Viscosity of oil extended EPDM
$\Delta PHR$: Oil extension amount per 100 parts by weight of EPDM (2) Particle shape index ($\alpha$):

Bulk density $D_A$ of particulate olefinic copolymer rubber was measured by measuring the weight of thereof per 1 L (kg/L). (Graduated measuring cylinder of 500 ml was used.)

Similarly, bulk density $D_B$ of olefinic plastic was measured.

Particle shape index $\alpha$ was calculated by the following formula.

$$\alpha = D_A/D_B$$

(3) Hardness: This was measured in accordance with ASTM D-2240. (Type A, instantaneous value).

(4) Tensile strength at break: This was measured in accordance with JIS K-6301 (JIS No. 3 dumbbell, pulling rate 200 mm/min).

(5) Elongation at break: Same as for tensile strength at break.

(6) Compression set: This was measured in accordance with JIS K-6301. (70° C., 22 hours, compressibility 25%).

(7) Melt flow rate (MFR): This was measured in accordance with JIS K-7210 (230° C.).

(8) Extrusion moldability: This was evaluated by surface texture of extruded sheet of 0.2 mm thick made by USV 25 mm$\phi$ extruder manufactured by Union Plastic Co. using full flight type screw and T die. This was graded by the following criteria.

◯: Excellent
x: Roughened surface (9) Injection moldability: Injection molded article was made by FS-75N injection molding machine manufactured by Nissei Plastic Industrial Co., Ltd., at a molding temperature of 220° C. and a mold temperature of 50° C. for an injection time of 10 seconds and a cooling time of 30 seconds under an injection pressure of 2.5 kg/cm² which is a minimum filling pressure required for completely filling the composition in the mold with a mold having the shape of 150 mm×90 mm×2 mm with using a normal gate. The moldability was evaluated by the surface texture of the molded article and graded by the following criteria.

◯: Excellent
x: Roughened surface

(10) Observation by electron microscope:

The molded test piece was treated with vapor of 1% aqueous $RuO_4$ solution at 60° C. for 1 hour to dye the rubber portion and then this test piece was cut by a microtome cooled to $-80°$ C. to make an ultrathin slice of about $0.1\mu$ thick. Morphology of this ultrathin slice was observed by a transmission electron microscope (H-8000 manufacture by Hitachi Limited). Magnification was ×6000.

Production conditions by twin screw kneader were as shown below.

Twin screw kneader used: TEX44HCT manufactured by The Japan Steel Works Ltd. (L/D=38.5, the number of cylinder blocks=11)

Construction of cylinder is as shown in the following (1) for Examples 1-4 and is as shown in the following (2) for Comparative Examples 1-2. Both have 11 cylinder blocks of C1-C11 and the first feed opening was provided at C1 and vending port was provided at C10. In the construction of (1), the second feed opening for feeding organic peroxide was provided at C5. D indicates a die outlet part. In the construction (1), the direction of C1→C11 is downstream side of the extruder.

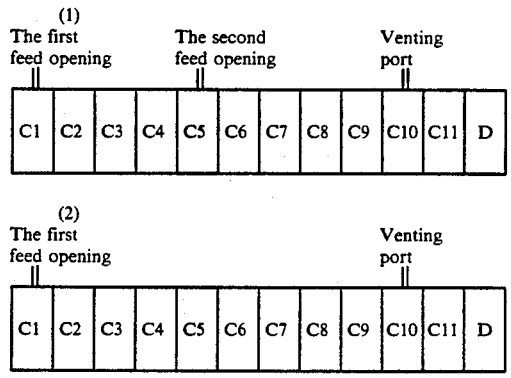

EXAMPLE 1

To 4 wt % solution of EPDM (ethylene-propylene-ethylidene norbornene copolymer rubber, viscosity=143, propylene=30% by weight, iodine value=10) in hexane was added 40 parts by weight of a mineral oil softener (Diana Process Oil PW380 manufactured by Idemitsu Kosan Co.) per 100 parts by weight of EPDM, followed by steam stripping to remove the solvent. This oil extended EPDM (viscosity=78) was ground by a grinder to obtain a particulate oil extended rubber (oil extended EPDM-1) having a bulk density of 0.39 kg/L.

Then, 100 parts by weight of the resulting particulate oil extended rubber, 43 parts by weight of crystalline polypropylene having a MFR (230° C., 2.16 kg load) of 2 and a bulk density of 0.55 kg/L (PP-1) and 0.57 part by weight of N,N-m-phenylenebismaleimide (BM) were mixed for 30 seconds by a super mixer (manufactured by Kawada Seisakusho Co.).

This mixture ($\alpha=0.71$) was fed from the first feed opening (C1) of the twin screw kneader (TEX44HCT manufactured by The Japan Steel Works, Ltd., L/D=38.5) having the above cylinder construction (1) at 30 kg/hr to carry out melt kneading. Then, 2,5-dimethyl-2,5-di-(tert-butylperoxy)hexane (hereinafter referred to as "organic peroxide") diluted to 10% by weight with a mineral oil (paraffinic oil Diana Process Oil PW90 manufactured by Idemitsu Kosan Co.) (PO-1) was fed from the second feed opening (C5 of the cylinder construction (1)) at 240 g/hr to carry out dynamic crosslinking and the product was pelletized. The resulting pellets were evaluated on properties and extrusion remoldability. The maximum shear rate in the dynamic crosslinking part was about 1600/sec.

Measurement of hardness, tensile strength and compression set were carried out on a sheet of 1 mm thick obtained by the extrusion molding.

Results of the evaluations are shown in Table 1.

EXAMPLE 2

The procedure of Example 1 was repeated except that a mixture of 100 parts by weight of oil extended EPDM, 43 parts by weight of PP-1 and 0.29 part by weight of N,N-m-phenylenebismaleimide (BM) was fed from the first feed opening and the organic peroxide diluted to 13.3% by weight with silica and talc (PO-2) was fed from the second feed opening at 180 g/hr. Results of the evaluations are shown in Table 1. Observation of this sample by transmission electron microscope revealed that superior dispersion was attained as shown in FIG. 1. That is, it is seen in FIG. 1 that EPDM domain (grey) was finely dispersed in less than about $3\mu$ in polypropylene matrix (white). It is considered that this contributed to the development of the good properties shown in Table 1.

EXAMPLE 3

The procedure of Example 2 was repeated except that PO-2 was fed at 90 g/hr. Results of the evaluation are shown in Table 1.

COMPARATIVE EXAMPLE 1

A composition was obtained in the same manner as in Example 1 except that a twin screw extruder having the cylinder construction (2) was used and a mixture comprising 100 parts by weight of oil extended EPDM-1, 43 parts by weight of PP-1, 0.57 part by weight of N,N-m-phenylenebismaleimide and 0.15 part by weight of the organic peroxide diluted to 40% by weight with silica (PO-3) was fed from the first feed opening (C1 in the cylinder construction (2)).

Figure 2:
FIG. 2 is an electron microscope which shows particle structure of the composition obtained in Comparative Example.

As shown in Table 1, the surface of the extruded sheet was very roughened. Further, observation by a transmission electron microscope reveals that only very unhomogeneous dispersion was obtained. (See FIG. 2). That is, it is seen in FIG. 2 that EPDM domain (grey) was roughly dispersed in about 4–6 $\mu$m in polypropylene matrix (white). This is considered to cause the inferior properties, especially tensile strength and extrusion moldability shown in Table 1.

EXAMPLE 4

To 4 wt % solution of EPDM (ethylene-propylene-ethylidenenorbornene copolymer rubber, viscosity=242, propylene=28% by weight, iodine value=12) in hexane was added 100 parts by weight of a mineral oil softener (Diana Process Oil PW380 manufactured by Idemitsu Kosan Co.) per 100 parts by weight of EPDM, followed by steam stripping to remove the solvent. This oil extended EPDM (viscosity=53) was ground by a grinder to obtain a particulate oil extended rubber (oil extended EPDM-2) having a bulk density of 0.29 kg/L.

Then, 100 parts by weight of the resulting particulate oil extended rubber, 15 parts by weight of crystalline polypropylene having an MFR (230° C., 2.16 kg load) of 10 and a bulk density of 0.60 kg/L (PP-2) and 1.27 part by weight of N,N-m-phenylenebismaleimide (BM) were mixed for 30 seconds by a super mixer (manufactured by Kawada Seisakusho Co.).

This mixture ($\alpha=0.48$) was fed from the first feed opening (C1 of the cylinder construction (1)) at 30 kg/hr as in Example 1. Then, the organic peroxide diluted to 50% by weight with a mineral oil (Diana Process Oil PW90 manufactured by Idemitsu Kosan Co.) (PO-4) was fed from the second feed opening (C5 of the cylinder construction (1)) at 480 g/hr to carry out dynamic crosslinking and the product was pelletized. The resulting pellets were evaluated on properties and extrusion moldability.

Measurements of hardness, tensile strength and compression set were carried out on a sheet of 2 mm thick obtained by the extrusion molding.

Results of the evaluations are shown in Table 2.

COMPARATIVE EXAMPLE 2

A composition was obtained in the same manner as in Example 4 except that a twin screw extruder having the cylinder construction (2) was used and a mixture comprising 100 parts by weight of oil extended EPDM-2, 15 parts by weight of PP-2, 1.27 part by weight of N,N-m-phenylenebismaleimide (BM) and 0.92 part by weight of the organic peroxide diluted to 40% by weight with silica (PO-3) was fed from the first feed opening (C1 in the cylinder construction (2)).

Results of the evaluation are shown in Table 2.
Note-1 and Note-2 in Tables 1–2 are as follows:
Note-1: Amount (part by weight) of the organic peroxide fed per 100 parts by weight of EPDM-1
Note-2: Amount (part by weight) of the organic peroxide fed per 100 parts by weight of EPDM-2

TABLE 1

| | | Example 1 | Example 2 | Example 3 | Comparative Example 1 |
|---|---|---|---|---|---|
| Mixing | | | | | |
| The first feed opening (30 kg/hr) | Oil-extended EPDM-1 | 100 | 100 | 100 | 100 |
| | PP-1 | 43 | 43 | 43 | 43 |
| | BM | 0.57 | 0.29 | 0.29 | 0.57 |
| | PO-3 (Note 1) | — | — | — | (0.06) |
| The second feed | PO-1 (Note 1) | 240 g/hr (0.12) | — | — | — |

TABLE 1-continued

| | Example 1 | Example 2 | Example 3 | Comparative Example 1 |
|---|---|---|---|---|
| opening PO-2 (Note 2) | — | 180 g/hr (0.12) | 90 g/hr (0.06) | |
| Dynamic crosslinking conditions | | | | |
| Preset temperature of dynamic crosslinking part °C. | 180–200 | 180–200 | 180–200 | 180–200 |
| Resin temperature at die outlet °C. | 255 | 256 | 254 | 258 |
| Properties | | | | |
| MFR 230° C. 10 kg load (g/10 min.) | 6.8 | 10 | 9.7 | 13 |
| Hardness (Shore-A) | 85 | 83 | 86 | 79 |
| Tensile strength at break (kg/cm$^2$) Mechanical direction | 165 | 135 | 150 | 110 |
| Tensile strength at break (kg/cm$^2$) Traverse direction | 161 | 144 | 145 | 102 |
| Elongation at break (%) Mechanical direction | 800 | 790 | 790 | 700 |
| Elongation at break (%) Traverse direction | 810 | 820 | 810 | 720 |
| Compression set (%) | 61 | 60 | 69 | 69 |
| Extrusion moldability | ○ | ○ | ○ | X |

TABLE 2

| | | Example 4 | Comparative Example 2 |
|---|---|---|---|
| Mixing | | | |
| The first feed opening (30 kg/hr) | Oil-extended EPDM-1 | 100 | 100 |
| | PP-1 | 15 | 15 |
| | BM | 1.27 | 1.27 |
| | PO-3 (Note 1) | — | 0.92 (0.37) |
| The second feed opening | PO-4 (Note-2) | 384 g/hr (0.64) | — |
| Dynamic crosslinking conditions | | | |
| Preset temperature of dynamic crosslinking part °C. | | 180–200 | 180–200 |
| Resin temperature at die outlet °C. | | 258 | 255 |
| Properties | | | |
| MFR 230° C. 10 kg load (g/10 min.) | | 24 | 53 |
| Hardness (Shore-A) | | 65 | 62 |
| Tensile strength at break (kg/cm$^2$) | | 50 | 47 |
| Elongation at break (%) | | 430 | 420 |
| Compression set (%) | | 33 | 32 |
| Injection moldability | | ○ | X |

The present invention provides a method for producing olefinic TPE compositions substitutable for vulcanized rubbers which are improved in mechanical properties such as tensile strength, breaking extension and compression set in low hardness region of olefinic TPE and are further improved in processability and inhibited from bleeding of oil to the surface of molded articles.

We claim:

1. A method for producing a thermoplastic elastomer composition which comprises directly feeding a particulate olefinic copolymer rubber (A), wherein said particulate olefinic copolymer rubber (A) is a particulate oil-extended olefinic copolymer rubber containing 20–150 parts by weight of a mineral oil softener for 100 parts by weight of the olefinic copolymer rubber, having a particle shape index α defined below of 0.1–0.9, wherein the particulate olefinic copolymer rubber has a Mooney viscosity $ML_{1+4}$ 10° C. of 80–350, and an olefinic plastic (B) to a continuous kneading extruder to carry out melt kneading, wherein the weight ratio (A)/(B) of the particulate olefinic copolymer rubber (A) and the olefinic plastic (B) is 20-95/80-5, and then feeding an organic peroxide into said extruder at a position downstream from the location where (A) and (B) are introduced into said extruder to carry out dynamic cross-linking, wherein the dynamic crosslinking is carried out at a maximum shear rate of 500/sec or higher:

$$\alpha = D_A/D_B$$

wherein $D_A$ denotes bulk density of the particulate olefinic copolymer rubber (A) and $D_B$ denotes bulk density of the olefinic plastic (B).

2. A method according to claim 1, wherein the particulate oil extended olefinic copolymer rubber has a Mooney viscosity $ML_{1+4}$ 100° C. of 30–150.

3. A method according to claim 1, wherein the mineral oil softener is a paraffinic softener.

4. A method according to claim 1, wherein the olefinic copolymer rubber which constitutes the particulate olefinic copolymer rubber (A) is an ethylene-propylene-non-conjugated diene copolymer rubber.

5. A method according to claim 4, wherein the ethylene-propylene-non-conjugated diene copolymer rubber is an ethylene-propylene-ethylidenenorbornene copolymer rubber containing 10–55% by weight of propylene and 1–30% by weight of ethylidenenorbornene.

6. A method according to claim 1, wherein the olefinic plastic (B) is at least one member selected from the group consisting of polypropylene and propylene-α-olefin copolymer resin.

* * * * *